US006949725B2

(12) United States Patent
Gunter

(10) Patent No.: US 6,949,725 B2
(45) Date of Patent: Sep. 27, 2005

(54) ZONE HEATING OF SPECIMEN CARRIERS

(76) Inventor: Ian Alan Gunter, 40 Glebe Road, Stanmore, Middlesex HA7 4EL (GB)

( * ) Notice: Subject to any disclaimer, the term of this patent is extended or adjusted under 35 U.S.C. 154(b) by 0 days.

(21) Appl. No.: 10/488,457

(22) PCT Filed: Sep. 9, 2002

(86) PCT No.: PCT/GB02/04080

§ 371 (c)(1),
(2), (4) Date: Mar. 3, 2004

(87) PCT Pub. No.: WO03/022439

PCT Pub. Date: Mar. 20, 2003

(65) Prior Publication Data

US 2005/0029246 A1 Feb. 10, 2005

(30) Foreign Application Priority Data

Sep. 10, 2001 (GB) ............................................ 0121827

(51) Int. Cl.[7] ................................................ B23K 13/08
(52) U.S. Cl. ........................ 219/477; 219/478; 219/635
(58) Field of Search ................................ 219/635, 645, 219/647, 655, 656, 672, 673, 675, 662, 475, 477, 478–480; 435/6, 285.1, 286.1; 422/99, 104; 366/145, 146, 247; 439/289, 290, 294

(56) References Cited

U.S. PATENT DOCUMENTS 5,451,500 A * 9/1995 Stapleton ....................... 435/6
5,525,300 A * 6/1996 Danssaert et al. ............ 422/99
5,529,391 A * 6/1996 Kindman et al. ........... 366/145
5,602,756 A 2/1997 Atwood et al.
5,616,301 A * 4/1997 Moser et al. ............... 422/104
2001/0019704 A1 9/2001 Gunter

FOREIGN PATENT DOCUMENTS

| | | |
|---|---|---|
| WO | WO 97/26993 | 7/1997 |
| WO | WO 97 26993 A | 7/1997 |
| WO | WO 00 32312 A | 6/2000 |
| WO | WO 01 62389 A | 8/2001 |
| WO | WO 01/72424 A1 | 10/2001 |

* cited by examiner

*Primary Examiner*—Tu Hoang
(74) *Attorney, Agent, or Firm*—Clifford W. Browning

(57) ABSTRACT

The present invention relates to heating of samples in specimen carriers, and more particularly to the heating of zones of a specimen carrier for differential heating of samples in a specimen carrier, including a specimen carrier in the form of a metallic sheet, in which a matrix of sample wells is incorporated, apparatus for applying electrical heating current through the carrier, having a plurality of electrical current sources, each connected in series across the carrier and together providing a variety of different possible current flow paths whereby localised regions of the carrier may be selectively heated. The current applied is either alternating current, or direct current.

18 Claims, 16 Drawing Sheets

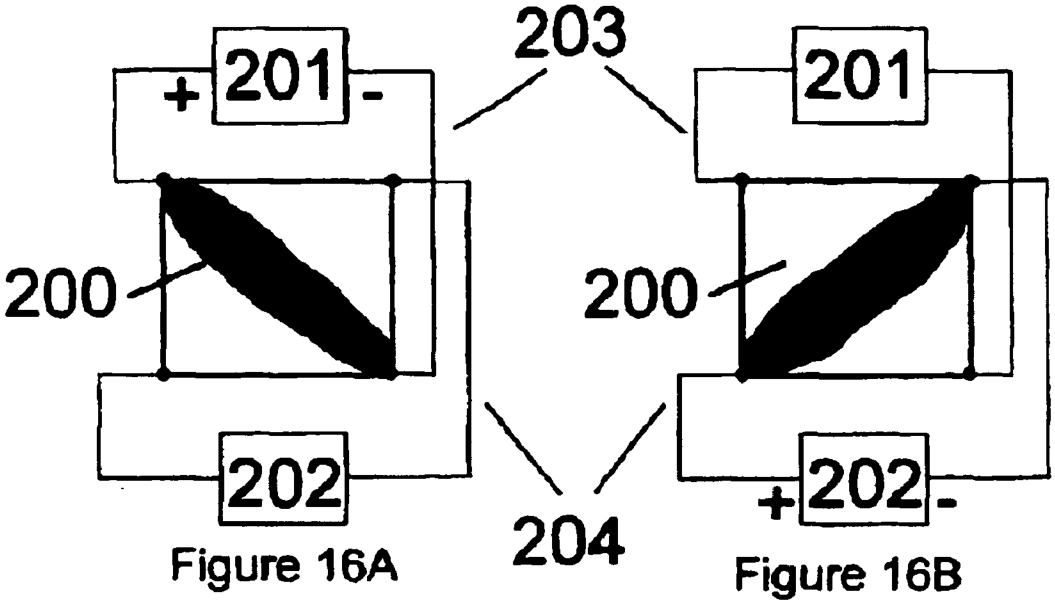
Figure 16A
Figure 16B
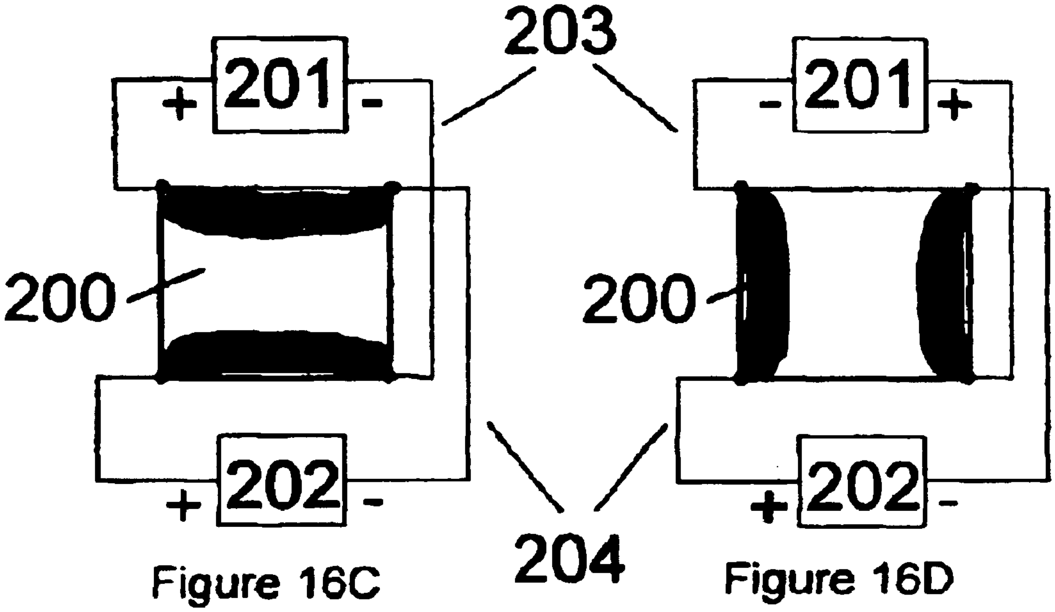
Figure 16C
Figure 16D

ZONE HEATING OF SPECIMEN CARRIERS

I hereby claim foreign priority benefits under Title 35, United States Code §119 of Great Britain Application No. 0121827.0 filed Sep. 10, 2001.

The present invention relates to heating of samples in specimen carriers, and more particularly to the heating of zones of a specimen carrier for differential heating of samples in a specimen carrier.

In many fields specimen carriers in the form of support sheets which may have a multiplicity of wells or impressed sample sites, are used for various processes where small samples are heated or thermally cycled.

BACKGROUND OF THE INVENTION

A particular example is the Polymerase Chain Reaction method (often referred to as PCR) for replicating DNA samples. Such samples require rapid and accurate thermal cycling, and are typically placed in a multi-well block and cycled between several selected temperatures in a pre-set repeated cycle. It is important that the temperature of the whole of the sheet or more particularly the temperature in each well be as uniform as possible.

The samples are normally liquid solutions, typically between 1 micro-1 and 200 micro-1 in volume, contained within individual sample tubes or arrays of sample tubes that may be part of a monolithic plate. It is desirable to minimise temperature differentials within the volume of an individual sample during thermal processing. The temperature differentials that may be measured within a liquid sample increase with increasing rate of change of temperature and may limit the maximum rate of change of temperature that may be practically employed.

Previous methods of heating such specimen carriers have involved the use of attached heating devices such as wire, strip and film elements and Peltier effect thermoelectric devices, or the use of indirect methods where separately heated fluids are directed into or around the carrier The previous methods of heating suffer from the disadvantage that heat is generated in a heater that is separate from the specimen carrier that is required to be heated.

The thermal energy must then be transferred from the heater to the carrier sheet which, in the case of an attached heater element, occurs through an insulating barrier and in the case of a fluid transfer mechanism occurs by physically moving fluid from the heater to the sheet.

The separation of the heater from the block introduces a time delay or “lag” in the temperature control loop. That is to say that the application of power to the heating elements does not produce an instantaneous or near instantaneous increase in the temperature of the block. The presence of a thermal gap or barrier between the heater and the block requires the heater to be hotter than the block if heat energy is to be transferred from the heater to the block. Therefore, there is a further difficulty that cessation of power application to the heater does not instantaneously stop the block from increasing in temperature.

The lag in the temperature control loop will increase as the rate of temperature change of the block is increased. This can lead to inaccuracies in temperature control and limit the practical rates of change of temperature that may be used.

Inaccuracies in terms of thermal uniformity and further lag may be produced when attached heating elements are used, as the elements are attached at particular locations on the block and the heat produced by the elements must be conducted from those particular locations to the bulk of the block. For heat transfer to occur from one part of the block to another, the first part of the block must be hotter than the other.

Another problem with attaching a thermal element, particularly a Peltier effect device, is that the interface between the block and the thermal device will be subject to mechanical stresses due to differences in the thermal expansion coefficients of the materials involved. Thermal cycling will lead to cyclic stresses that will tend to compromise the reliability of the thermal element and the integrity of the thermal interface.

Our PCT application GB97/00195 has disclosed a novel method where the specimen carrier is metallic and an alternating current is applied to the metallic specimen carrier in order to provide direct resistive heating. The Specification of the aforesaid PCT application discloses various features of heating the carrier and the whole of that disclosure is part of this Specification.

Our PCT application GB01/01284 discloses a method of heating a specimen carrier by applying an alternating current through the specimen carrier and relying upon resistive heating to provide direct heating of the carrier. An added benefit of this method of heating is that magnetically responsive stirrers placed in each specimen well are agitated by the applied current. The whole of the disclosure of that patent application is part of this Specification.

Direct resistive heating has no practical power limitations, and is the preferred means of heating in just about every respect, particularly when rapidly thermal cycling PCR samples. However, one disadvantage of direct resistive heating is that it precludes zonal heating of specimen carriers, which is required for certain applications. In zonal heating, different zones or regions of a carrier are heated to a different extent. Zonal heating is relatively easily implemented by the use of several heating elements attached to the carrier. Differential heating applied by the elements allows zonal heating of the carrier to be achieved. Needless to say, this method suffers all of the disadvantages of the prior art described in the foregoing. Hence there is a requirement for a zonal heating system for carriers which does not suffer the problems of indirect heating of the specimen carrier.

SUMMARY OF THE INVENTION

According to one aspect of the present invention there is provided apparatus for heating samples, the apparatus comprising:

a specimen carrier in the form of a metallic sheet, in which sheet a matrix of sample wells is incorporated, means for applying electrical heating current through the carrier, characterised by a plurality of electrical current sources, each connected across the carrier and together providing a variety of different possible current flow paths whereby localised regions of the carrier may be selectively heated.

In one embodiment, the current applied is alternating current. In this case the sources of current may each comprise a secondary transformer loop, which loop is connected in series with the specimen carrier and provides alternating current in response to an alternating current applied to a primary winding associated with the loop.

There may be a separate primary winding for each secondary loop, each primary winding connected to an alternating current power supply.

Preferably the apparatus is provided with a controller device adapted to permit changing of the relative phasing of one or more of the alternating current in at least one of the loops with respect to the others, thereby to change a locus of current flow through the carrier.

A phase change of 180 degrees in a secondary loop is selected by reversing the sense of the current in a primary winding driving the secondary loop.

In one exemplified embodiment there are three sources of alternating current, each being a secondary loop of a transformer. These may be connected across opposite sides of a rectilinear specimen carrier. In a preferred embodiment there are four sources of alternating current each arranged as described above.

In another aspect of the invention the current provided by the sources is direct current. In this case the sources of direct current comprise direct current power supplies, which may for example be linear, switch mode or battery power supplies.

Preferably the apparatus of this aspect is provided with a controller device adapted to permit changing the polarity of one or more of the sources with respect to the others, thereby to change a locus of current flow through the specimen carrier.

The apparatus described in any aspect above may in a preferred arrangement be provided with a temperature controller for controlling the magnitude of current flowing from each source of current, thereby to control the degree of heating conferred by the current through the carrier.

The specimen carrier may provided with a plurality of temperature sensors, which temperatures provide feedback to the temperature controller thereby to permit monitoring and control of the temperature of local portions of the carrier.

The temperature controller may be programmable to provide predetermined thermal cycles in the carrier, and therefore thermal cycling of the samples.

The temperature controller may conveniently comprise a computer provided with digital to analogue converters for controlling the current sources and analogue to digital converters which provide temperature data feedback from the temperature sensors.

According to the present invention there may also be provided a method for heating samples comprising providing a specimen carrier in the form of a metallic sheet, in which sheet a matrix of sample wells is incorporated, loading samples into a plurality of the wells, applying current to the specimen carrier, which current is applied by a plurality of sources of current, each source connected across the carrier and together providing a variety of different possible current flow paths whereby localised regions of the carrier may be selectively heated.

Needless to say the method may conducted by means of apparatus as herein described.

Preferably, the current source connected to the carrier passes through a loop or other conductor which has lower resistance than the sheet. In this way less heat is generated by passage of current through the secondary loop, than is generated by passage of the same current through the sheet. This is useful in practice as the efficiency of both heating and cooling of the sheet is increased. Of course the lower resistance may be achieved by selecting the material and/or dimensions of the loop or other conductor.

A cooling system may be provided for cooling the sheet. This may consist of gas or liquid cooling, but is conveniently air cooling by means of a fan. The fan may be driven by the temperature controller, so that the fan cooling may be included in the temperature control regimes provided.

Specimen Carrier Sheet

The sheet may be of silver or similar material of high thermal and electrical conductivity and will generally have a thin section in the region of 0.3 mm thickness, where the matrix of sample wells is incorporated in the sheet. The sample wells may incorporate samples directly or may carry sample pots or test tubes shaped to closely fit within the wells.

The sheet may have an impressed regular array of wells to form a block and a basal grid or perforated sheet may be attached to link the tips of the wells at their closed ends to form an extremely rigid three-dimensional structure. In some applications the mechanical stiffness of the block is an important requirement. Where a basal grid is used, heating current is also passed through the metal of the grid. The basal grid is preferably made of the same metal as the block.

While the metallic sheet may be a solid sheet of silver (which may have cavities forming wells) an alternative is to use a metallised plastic tray (which may have impressed wells), in which deposited metal forms a resistive heating element.

Another alternative is to electro form a thin metal tray (which again may have impressed wells), and to coat the metal with a bio-compatible polymer.

These measures enable intimate contact to be achieved between the metallic heating element and the bio-compatible sample receptacles. This gives greatly improved thermal performance in terms of temperature control and rate of change of temperature when the actual temperatures of the reagents in the wells is measured.

The plastic trays are conventionally single use disposable items. The incorporation of the heating element into the plastic trays may increase their cost, but the reduction in cycling time for the PCR reaction more than compensates for any increased cost of the disposable item.

The bottom of the composite tray should be unobstructed if fan cooling is employed. If sub-ambient cooling is required at the end of the PCR cycles, either with a composite tray or a block, chilled liquid spray-cooling may be employed. The boiling point of the liquid should be below the low point of the PCR cycle so that liquid does not remain on the metal of the tray or block to impede heating. This also allows for the latent heat of evaporation of the liquid to increase the cooling effect.

The apparatus may be provided with an interface region between the metallic sheet and a bus bar portion of the secondary loop. The interface region should have similar physical and electrical characteristics as the sheet material, conveniently it may be made from the same sheet material.

Beating

The heating current may be an alternating current supplied by a transformer system wherein the heating power is controlled by regulating the power supplied to the primary winding of the transformer. The sheet to be heated may be made part of the transformer secondary circuit. The secondary winding may be a single or multiple loop of metal that is connected in series with the sheet. By these means, the high current, low voltage power that is required to heat the highly conductive sheet may be simply controlled by regulating the high voltage, low current power supplied to the primary winding of the transformer.

There may be a plurality of transformers, and in preferred embodiments three and (most preferred) four transformers. Each transformer may be provided with a toroidal core having an appropriate mains primary winding and a single bus bar looped through the core and connected in series with the metallic sheet to form a single turn secondary loop. Thus for four transformers there would be four bus bars connected in series with the metallic sheet.

In direct resistance heating using alternating current, an oscillating magnetic field is produced at each well by the heating current, permitting the use of sample agitators of the type described in PCT application GB01/01284, the disclosure of which is incorporated herein in its entirety.

The Sheet

Preferably, the bottom of the sheet, even if a basal grid is attached, has an open structure with a large surface area. Such a surface is ideal for forced-air cooling. Moreover, preferably there are no attached elements to impede free and full contact between the metal of the sheet and moving air.

Ducting of the air may be provided to encourage even cooling effects over the extent of the sheet. To allow for controlled cooling rates, the air movement may be under proportional control. The control response time of a device that imparts movement to air, for instance a mechanical element such as one or more fans, is slow compared to the fast electronic control response of the heating system. The heating system may therefore be used together with the fan to control the temperature changes of the sheet during cooling.

The secondary winding in series with the sheet may have more than one loop through the core of the transformer.

The power supply means and control for the heating current may be a high frequency AC power supply permitting a reduction in the amount of material in the transformer core.

The thermal uniformity of the sheet will be dependent on the heating power dissipation at any point in the sheet being matched to the thermal characteristics of that point. For instance, a point around the centre of the sheet will be surrounded by temperature controlled metal, whereas a point at the edge of the sheet or block will have temperature controlled metal on one side and ambient air on the other. The geometry of the sheet may be adjusted with the aim of achieving thermal uniformity. In general practice the geometry of sample sites or wells of a sheet or block will be a standardised regular array. The industry standard arrays consist of 48, 96 or 384 wells in a 110×75 mm rectangular plate or block. These layouts are arbitrary and larger arrays of 768 and 1536 wells may be used.

Typically, the geometric factors that may be varied comprise the thickness of the metal from which the sheet is formed, and if a basal grid is used, the geometry of the webs in the plane of the grid.

The present invention allows for differential heating across the area of the sheet. Consequently the heating control may be used to tailor the heating distribution as required. Active control of the heating system may therefore be used to attain or approach uniformity, or to obtain differential heating as required.

Method for Achieving Zone Control

In zone controlled heating, the control zones are defined by providing a number of different paths through which current may flow through the sheet when heating the block ("block" refers to the array of specimen samples loaded onto or into the sheet). In a preferred embodiment, this is realised by having several small transformers, each with primary windings, in place of a single large transformer such as would be used in the apparatus of PCT GB97/00195. A secondary loop for each transformer incorporates the sheet. The secondary loops continue to passes through the core of the primary winding. The RMS magnitude of the current through each transformer primary winding is then individually controlled.

The relative phase of the alternating currents through the sheet from the transformers may also be controlled, and this gives a greater number of possible current paths. This may be achieved by electrically reversing the connections to one or more of the transformers primary windings, or by having two primary windings on each transformer that is required to be reversed, one winding being driven in opposite sense to the other, (not simultaneously). Either option provides a simple means of changing the relative phasing of one or more of the several currents being supplied to the block, by 180 degrees. Thus by control over the RMS magnitude and the relative phasing of the currents supplied to a number of small transformers, a number of different heating current flow paths through the sheet may be realised.

A number of temperature sensors may be attached to the sheet in appropriate locations to provide feedback of the block temperature at several locations. The temperature control loop can then be closed through the use of a computer or other electronic control system. The control system should accept measured temperatures from the temperature sensors and in accordance with an appropriate algorithm, provide output signals to control the RMS magnitude and relative phasing of the currents supplied to the transformer primaries.

BRIEF DESCRIPTION OF THE DRAWINGS

Embodiments of the invention will now be described by way of example with reference to the accompanying diagrammatic drawings in which:

FIG. 16A to 16D are schematic representations of a direct current embodiment of the invention, shown in a series of different current application modes;

DETAILED DESCRIPTION OF THE PREFERRED EMBODIMENTS

Detailed Description of a Three Current Source Alternating Current Embodiment

An apparatus embodying the invention has been constructed by the applicants to be capable of repeatedly and rapidly thermally cycling a number, (384), of small samples between several programmable set temperatures and maintaining the programmed temperatures for programmed times at each temperature. The choice of 384 wells is not significant. Industry standard consumables and ancillary apparatus are available for use with 24, 48, 96, 384, 1536 well arrays, and the present invention is equally applicable to any number of wells in a block or array. The 384 samples are held in an array of 384 wells impressed in a sheet with an attached base plate. Such a configuration is commonly referred to as a 384 well block.

Figure 1A:
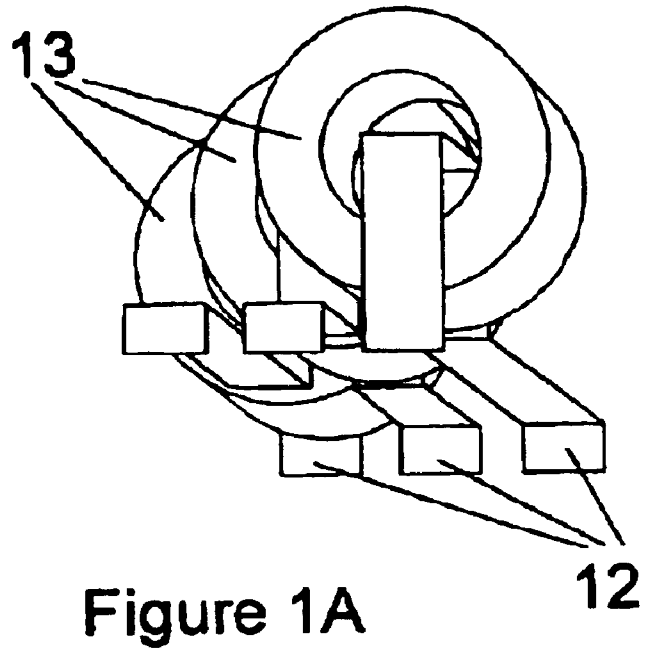
FIG. 1A is an inverted perspective view of three transformers and associated bus bars of a three transformer embodiment of the present invention.
Figure 1B:
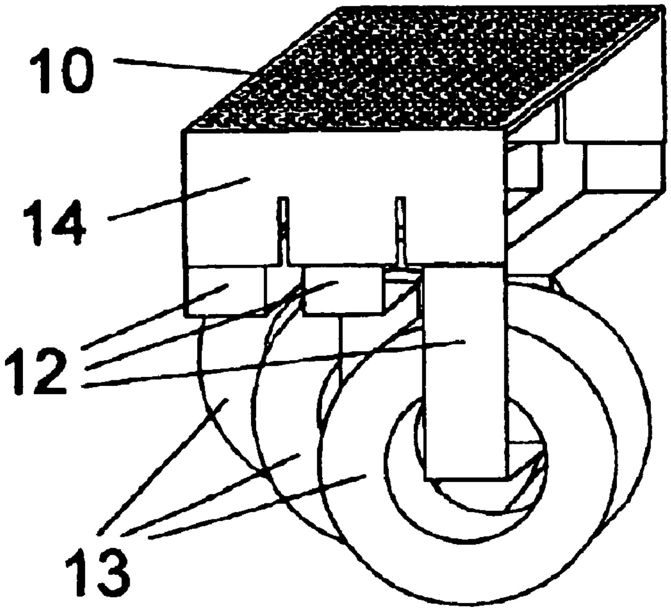
FIG. 1B is a perspective view of the embodiment of FIG. 1A.
Figure 2:
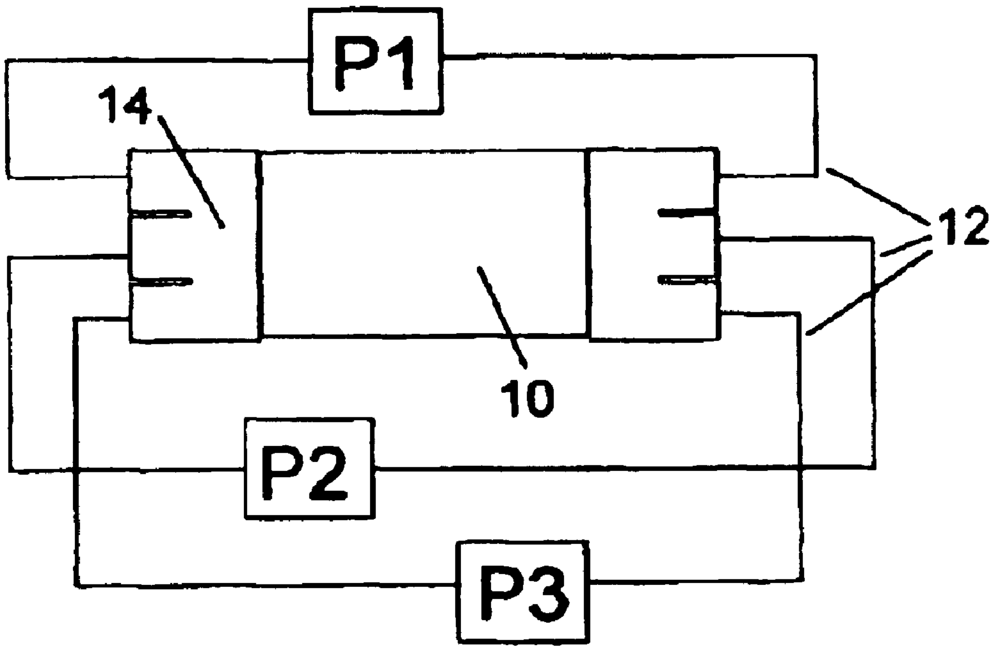
FIGS. 2 to 15 are schematic representations showing approximate current paths through the working area the apparatus of FIGS. 1A and 1B, for fourteen different transformer operation modes.
Figure 3:
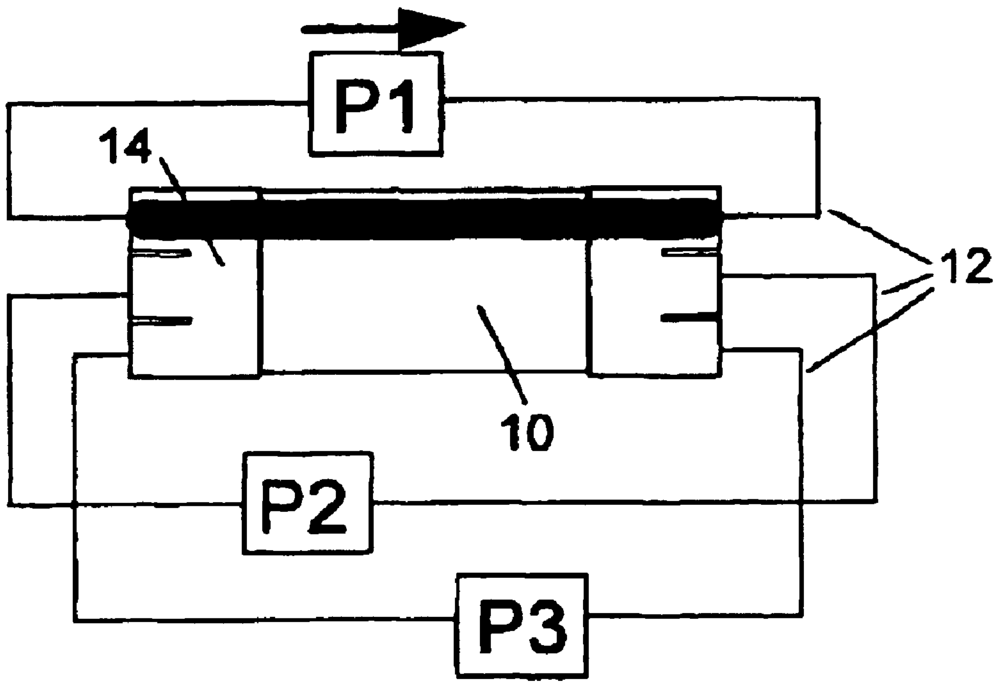
Figure 4:
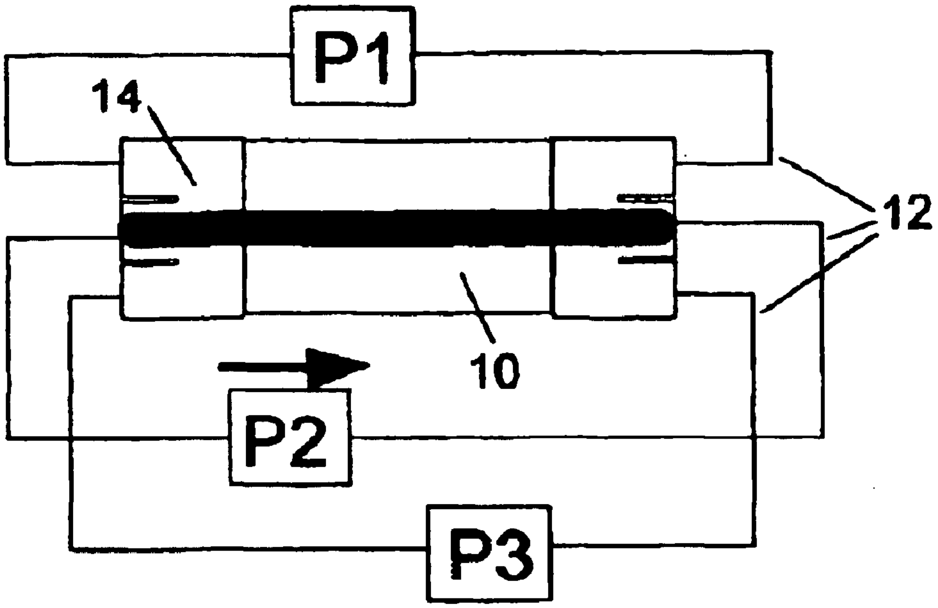
Figure 5:
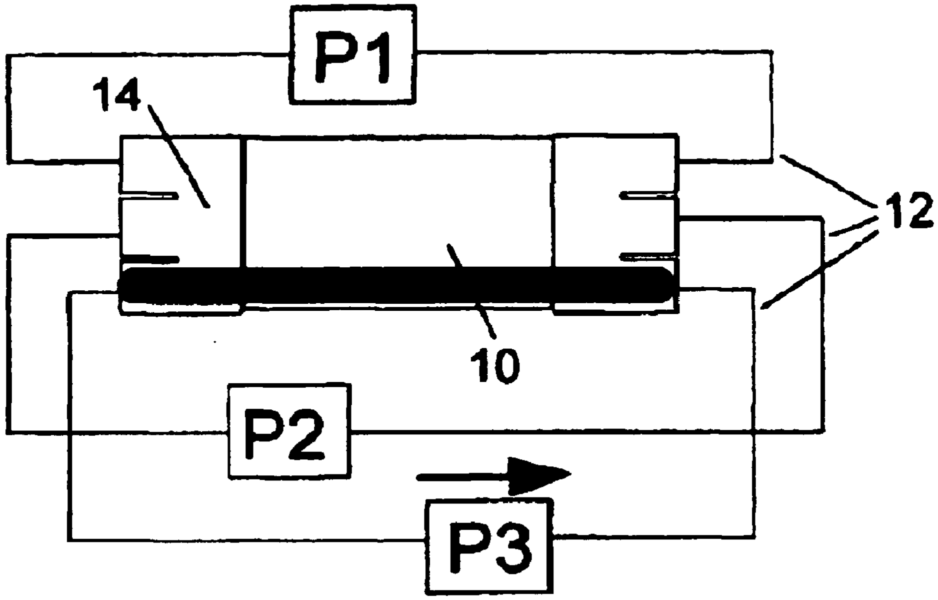
Figure 6:
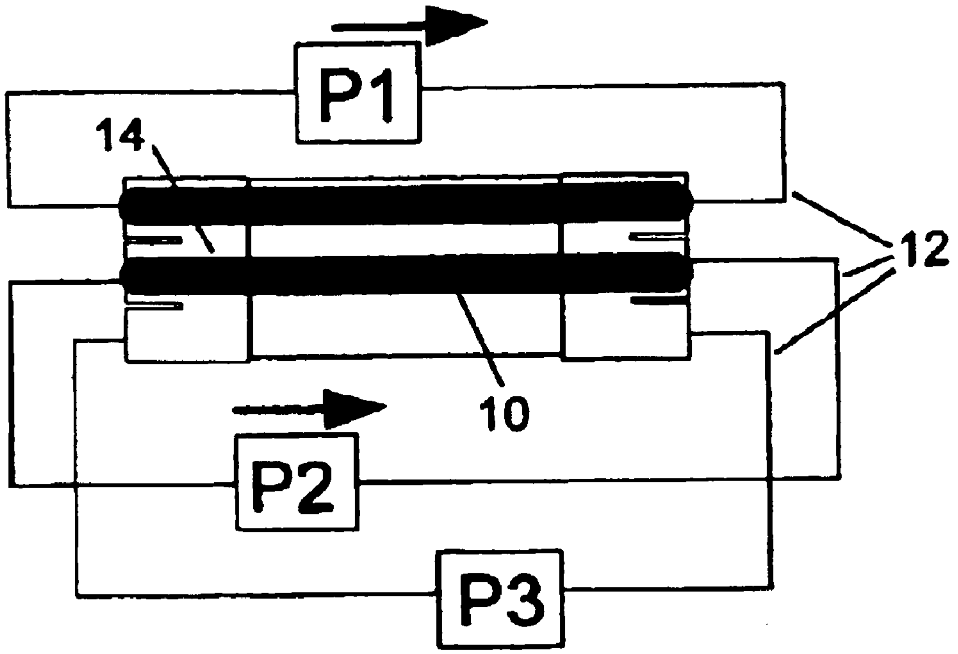
Figure 7:
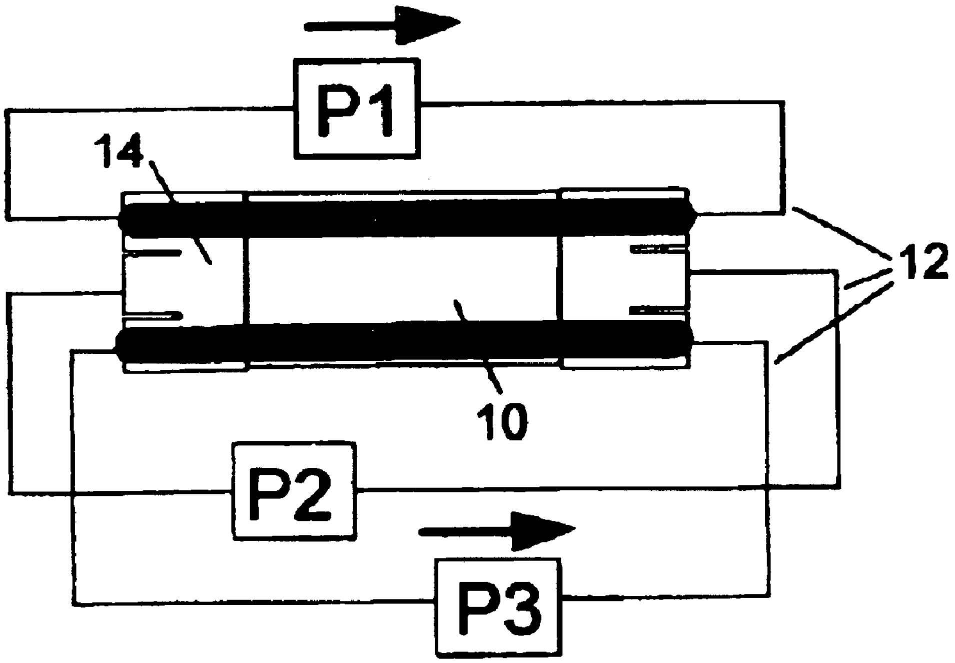
Figure 8:
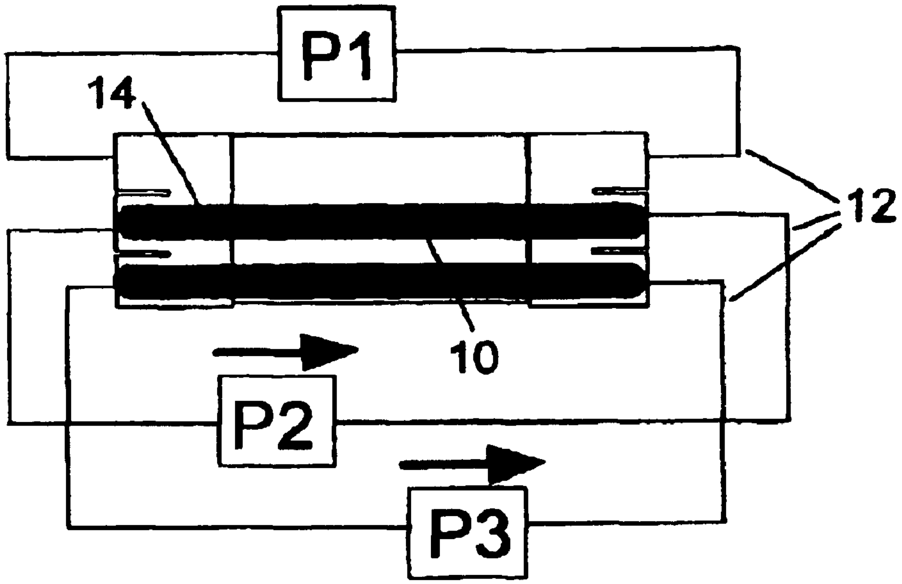
Figure 9:
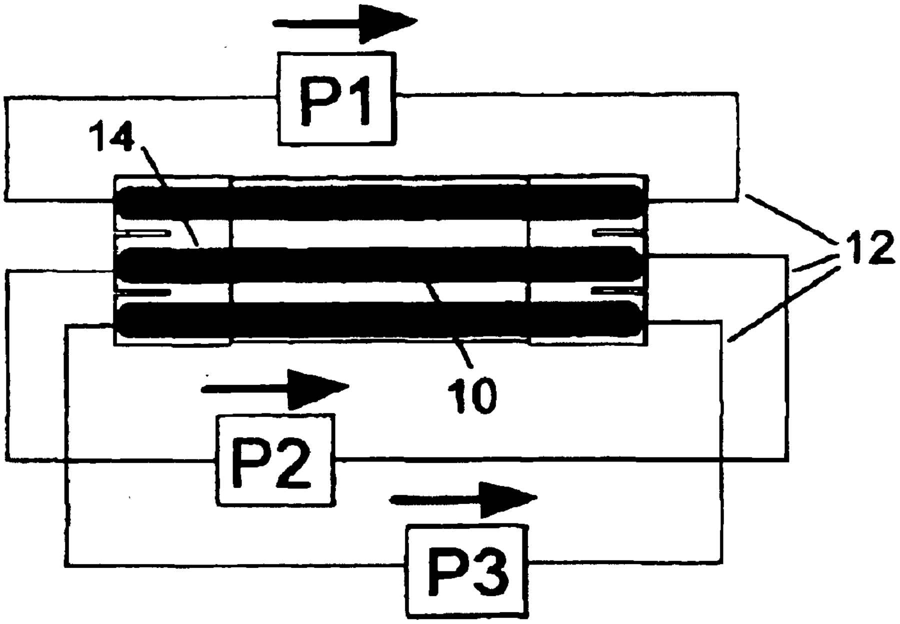
Figure 10:
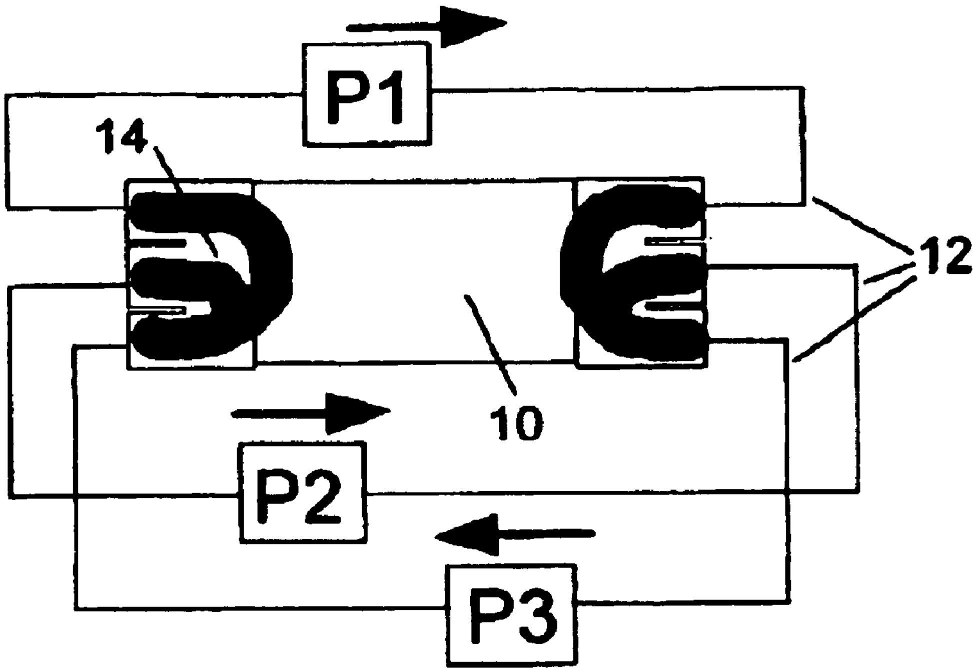
Figure 11:
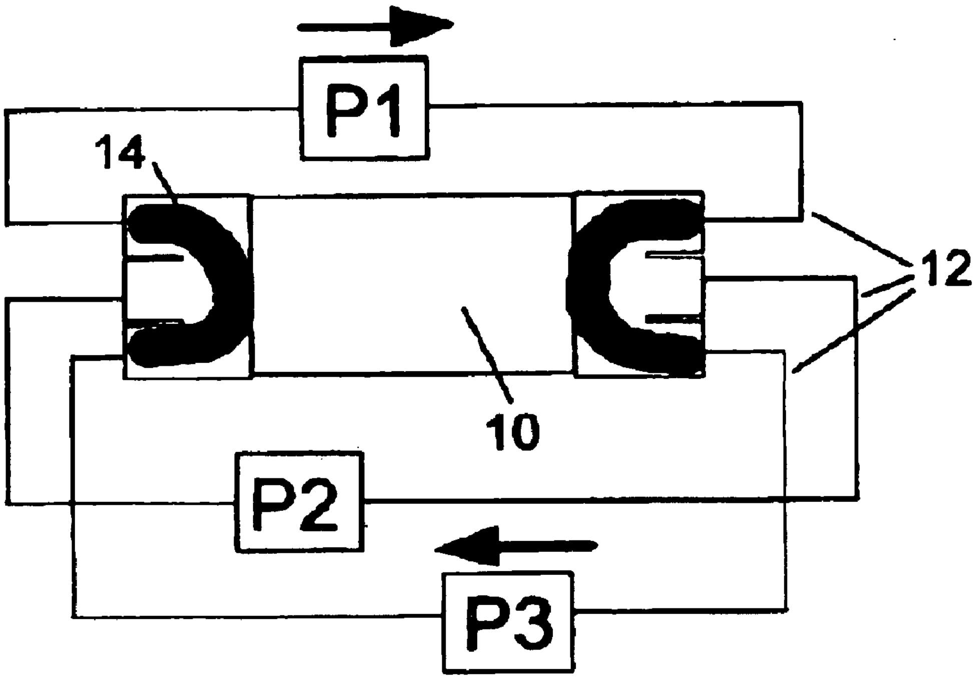
Figure 12:
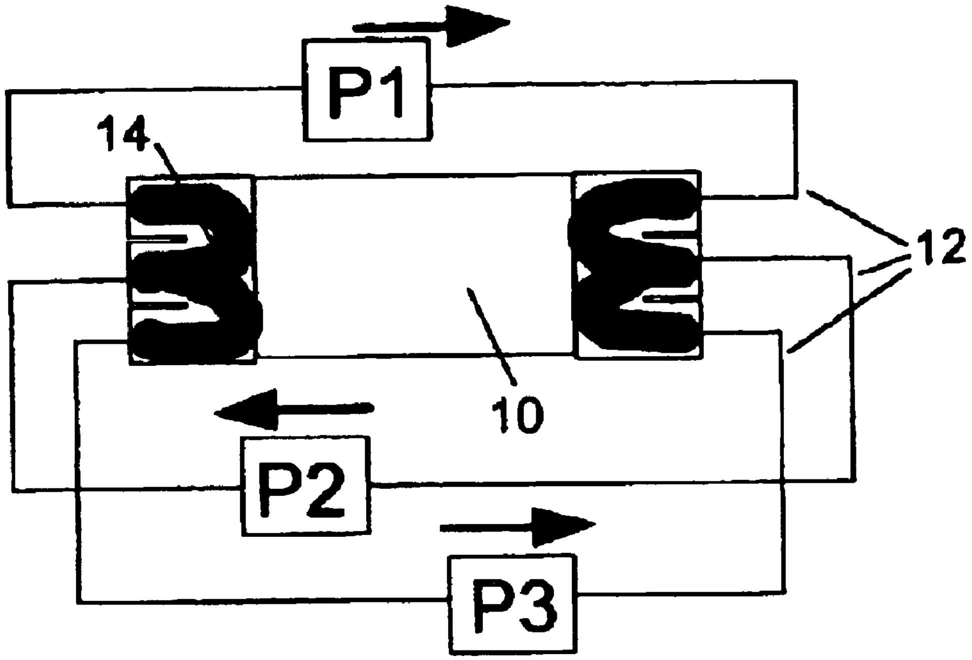
Figure 13:
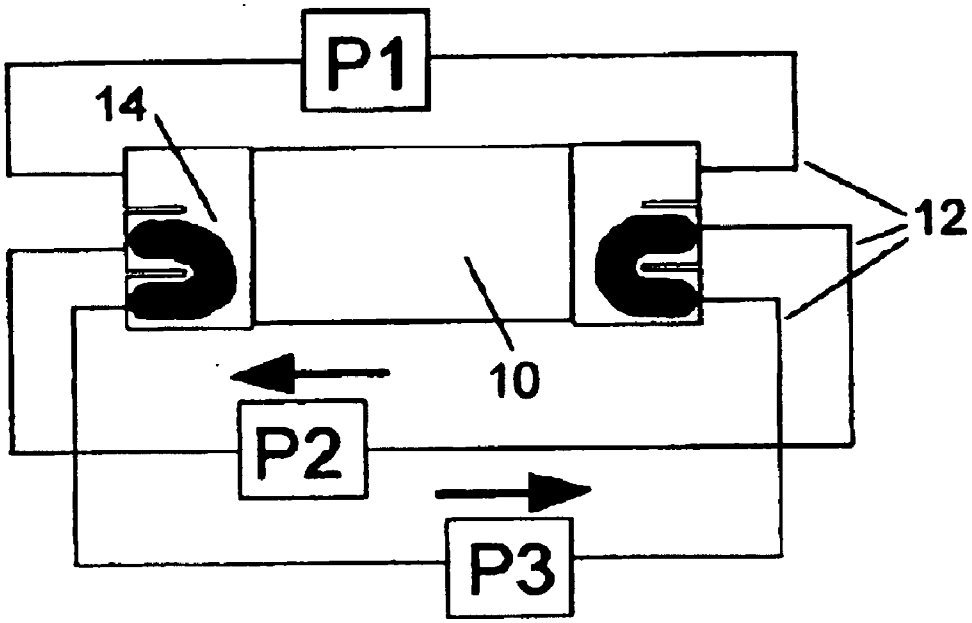
Figure 14:
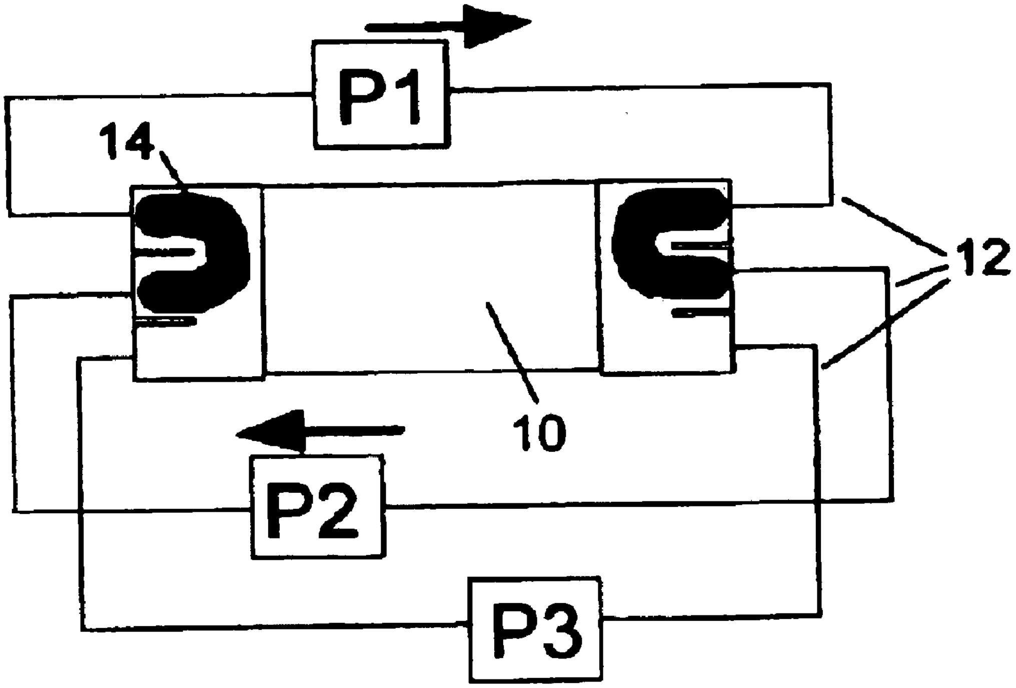
Figure 15:
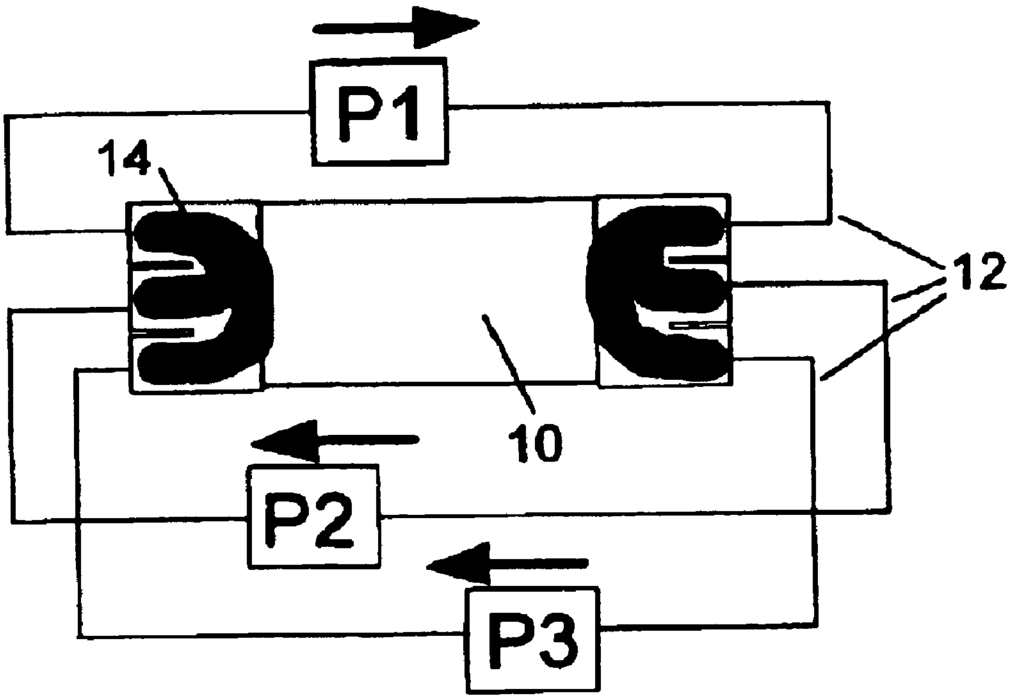

FIGS. 1A and 1B show the working parts of the apparatus with fans and baffle plates removed for clarity. In practice this sub-unit is enclosed in a ferrous or mu-metal box to provide magnetic shielding. A heated lid is used to firmly press the sample containers into each of the 384 wells.

The sheet 10 consists of a rectangular electro-formed 110×75 mm silver plate, 0.33 mm mean thickness. The sheet is formed with an impressed array of 384 (24×16), wells. Each well is 7 mm deep and conical in shape with the open end of each well being 3.5 mm diameter. Closed narrow ends of the conical wells are all linked by a perforated, 0.5 mm thick, silver base plate. The base plate perforations are each 3.5 mm diameter and located interstitially with respect to the wells.

This structure is mechanically stiff and open to airflow through perforations in the baseplate.

A fan system (not shown) with baffle plates is located under the block 10 to direct ambient air through the base plate perforations, around the wells protruding from the bottom of the top plate, and back out to the ambient environment.

Regulating the speed of the fan system controls the rate of cooling. Maintenance of the required temperature, distribution during cooling is facilitated by using the heating system to correct for any local temperature deviations.

There are three copper bus bars 12 of 25×3 mm cross section. These are joined to a 75 mm wide side of the block via an interfacial section 14 that effectively continues the thermal and electrical characteristics of the block around a 90-degree bend. Each bus bar passes through a toroidal transformer core 13, before looping round to join onto the other 75 mm side of the block, again via an interfacial section. The interfacial sections provide connectivity such that the heating current passes from the bus bar to both the top plate and baseplate of the block. The bus bars are of lower resistance than the block and interface regions. Therefore less heat is generated by passage of current through the bus bars, than is generated by passage of the same current through the block and the interfacial regions.

The block 10 has a low electrical resistance (typically less than 0.001 Ohms along the longer axis), therefore the total current passed through the block to produce a rapid heating effect will be high, (typically 1000–2000 A), and the voltage required to produce the current will be low, (typically 0.25 V).

There are six thermocouples (not pictured) soldered directly to the sheet in two lines normal to the long axis of the block. In each line the thermocouples are located at the edge, in the middle, and at the other edge of the short axis of the sheet. The two lines are in the middle of the long axis, and at one end of the sheet.

The signals from the thermocouples are amplified and converted from analogue to digital signals and passed to a Personal Computer (PC). The PC controls a 12 bit 4 channel digital to analogue converter. 3 channels are used to control proportional phase angle controllers that control the RMS magnitude of the current supplied to each of the three toroidal transformer primary windings. The remaining channel is used to proportionally control the speed of the fans. Two of the toroidal transformers have twin primary windings, which are connected in opposite sense. The computer can select which of the two windings on each of these two transformers is powered at any time.

Suitable software is provided to control the heating and cooling of the sheets via control of the current and fan cooling applied. The software is not described in detail herein as the production of suitable software to carry out control functions and regimes will be within the normal skill of the person skilled in the art of computer programming for heating control applications.

Operational Control of the Transformers

The three transformers 13 may be nominated as P1, P2 and P3. Two of these (P2 and P3) may be reversed in sense. Hence there are 14 distinctly different current path modes available. There are of course further, different combinations possible, but such additional combinations are either electrically equivalent or opposite to one of the 14 combinations illustrated hereinafter, and therefore are not different in heating effect. Many of the current path modes primarily involve the important interfacial region between the copper bus bars and the working block. The current magnitudes may also be varied within all modes.

Current Path Modes

Taking non-reversible transformer P1 to define a positive direction, then:

transformer on=1 transformer off=0 transformer reversed=−1

Then for three transformers P1, P2, and P3 we have the following modes (1 to 14)

| | P1 | P2 | P3 |
|---|---|---|---|
| 1. | 0 | 0 | 0 |
| 2. | 1 | 0 | 0 |
| 3. | 0 | 1 | 0 |
| 4. | 0 | 0 | 1 |
| 5. | 1 | 1 | 0 |
| 6. | 1 | 0 | 1 |
| 7. | 0 | 1 | 1 |
| 8. | 1 | 1 | 1 |
| 9. | 1 | 1 | −1 |
| 10. | 1 | 0 | −1 |
| 11. | 1 | −1 | 1 |
| 12. | 0 | −1 | 1 |
| 13. | 1 | −1 | 0 |
| 14. | 1 | −1 | −1 |

The current flow patterns associated with these modes are shown in FIGS. 2 to 15. In these Figures the approximate current paths are shown in heavy black and arrows associated with the transformers P1, P2, P3 indicate the relative sense or direction of the transformers that are on in each mode. These diagrams are schematic and are not intended to provide an exact analysis of current paths. They provide a gross indication of current flow, with the uniform power settings on all three transformers, in order to demonstrate the zone heating concept.

The path of the current corresponds to the heating effect conferred by the transformers. Conduction will spread the heat around these areas, but will provide the ability to give relatively localised heating. By PC controlled sequential switching between modes 1 to 14 it is possible to heat various individual regions simultaneously, rather than one current path region. Typically switching speed is achieved in around 0.5 of a mains cycle.

Direct Current Embodiment

FIG. 16 shows a series of four schematic representations of a direct current embodiment of the present invention. A specimen carrier block is shown as 200. There are two DC power supplies 201, 202, with polarity as signified on the figure. The power supplies each have leads 203,204 which may be positive or negative leads. These are connected across respective opposite corners of the carrier, as shown. Approximate current paths through the block 200 are shown in heavy black in the Figures.

The current path through the carrier may be changed by altering whether one or both of the supplies are on or off.

Hence in FIG. 16A the supply 201 is on and supply 202 is off, producing diagonal current flow in the carrier.

In FIG. 16B the supply 201 is off, and 202 is on, producing current flow along the other diagonal.

In FIG. 16C, supply 201 and 202 are both on, producing horizontal flow at upper and lower edge regions of the carrier.

In FIG. 16D, supply 201 has reversed polarity, and 202 unchanged polarity, producing vertical flow in left and right edge regions of the carrier block.

In this way heating may be locally directed along certain current paths, thereby effecting local heating, generally according to the path of the current. Switching may take place between the modes described in order to vary the heating location. As with the alternating current embodiments, current magnitude may varied to control the degree of heating, and temperature sensor feedback may be used to monitor and control heating.

The foregoing DC embodiment could be implemented using AC current power supply units. The current paths would be the same, and zonal heating would be achieved in the same way.

Four Current Source, Alternating Current Embodiment.

FIGS. 17 to 28 relate to a four current source or four transformer alternating current apparatus which embodies the invention and which is similar to the apparatus described with respect to FIGS. 1 to 15.

Figure 17A:
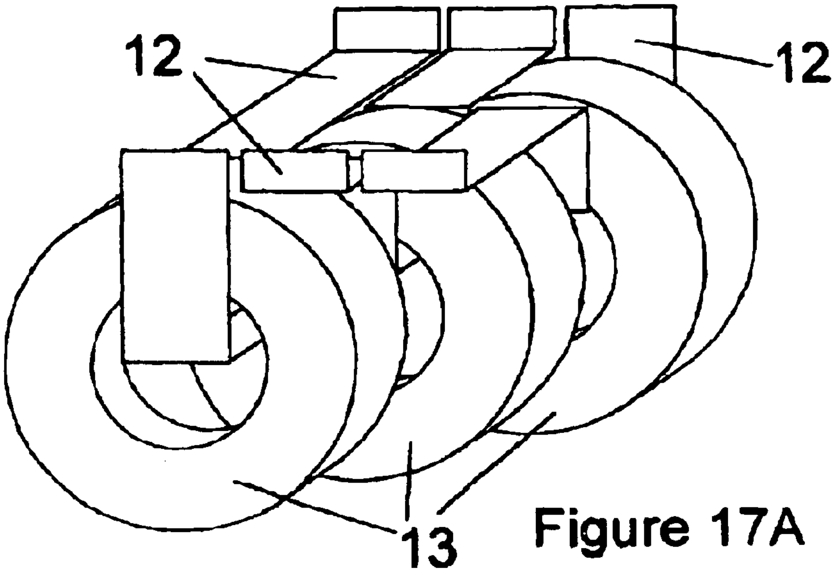
FIGS. 17A and 17B schematically show an apparatus embodying the invention and having four transformers.
Figure 17B:
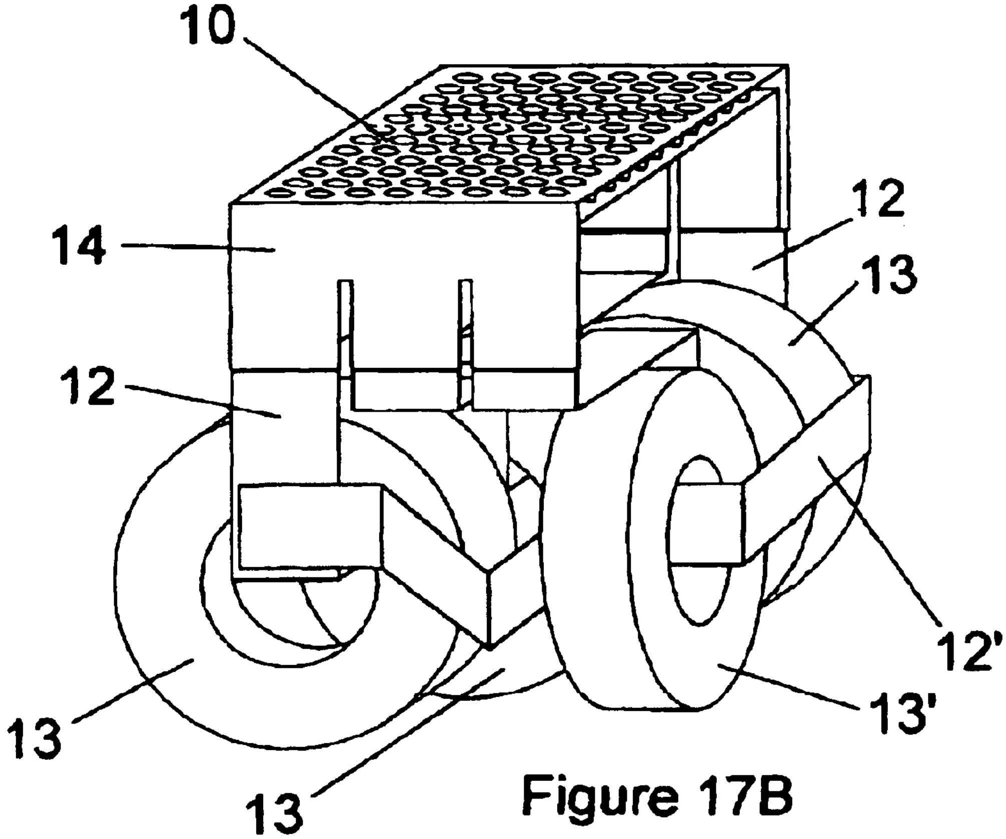

FIGS. 17A and 17B show the physical layout of the toroidal transformer coils 13, the bus bars 12 and the block 10 which form the heart of the apparatus. Again, for the sake of clarity the fans and air ducting systems are not shown.

FIG. 17A shows three of the transformer coils 13 with their associated bus bars 12 but omits the fourth transformer and the block for the sake of clarity. This fourth toroidal transformer coil 13' and its associated bus bar 12' are however shown in FIG. 17B. The bus bars 12 of three of the transformers (those shown in FIG. 17A) are directly connected to the block 10 via an interfacial region 14. The bus bar 12' of the remaining transformer 13' is connected to the block 10 via two of the other bus bars 12. In particular, the bus bar 12' of the fourth transformer is connected to the block via bus bars 12 which are connected to the block 10 at diagonally opposite corners.

It will be noted that the first three transformers 13 and the associated bus bars 12 which are connected directly to the block 10 have an arrangement which is substantially the same as that of the three transformer embodiment described with reference to FIGS. 1 to 15. The fourth transformer 13' and associated bus bar 12' represent an addition to that system. As will become clearer below the addition of the fourth transformer allows better control of the heating effect than is possible with a three transformer embodiment. In particular, the four transformer system is particularly useful for allowing independent control of the heating effect at each of the four edges of the block 10.

It will be understood that as is the case with the embodiments described above, the present apparatus will work with any of the industry standard arrays of wells. In the present embodiment, as shown in FIG. 17B, there is a 96 well block 10. In this embodiment the sheet of the block 10 consists of a rectangular electroformed 110×75 mm silver plate having a 0.33 mm mean thickness. Each well is 13 mm deep and conical in shape with the open end of each well being 6 mm in diameter. As in the embodiment described above, the closed narrow ends of each of the conical wells are linked by a perforated 0.5 mm thick silver baseplate.

The baseplate perforations are each 7.5 mm in diameter and located interstitially with respect to the wells. In this case there are nine thermocouples (not shown in FIGS. 17A or 17B) soldered in three lines directly to the sheet. There is one line of thermocouples at each end of the sheet 10 and another line parallel to these in the middle of the sheet 10.

In other respects the structure of the present apparatus is similar to that described with reference to FIGS. 1 to 15.

Figure 18:
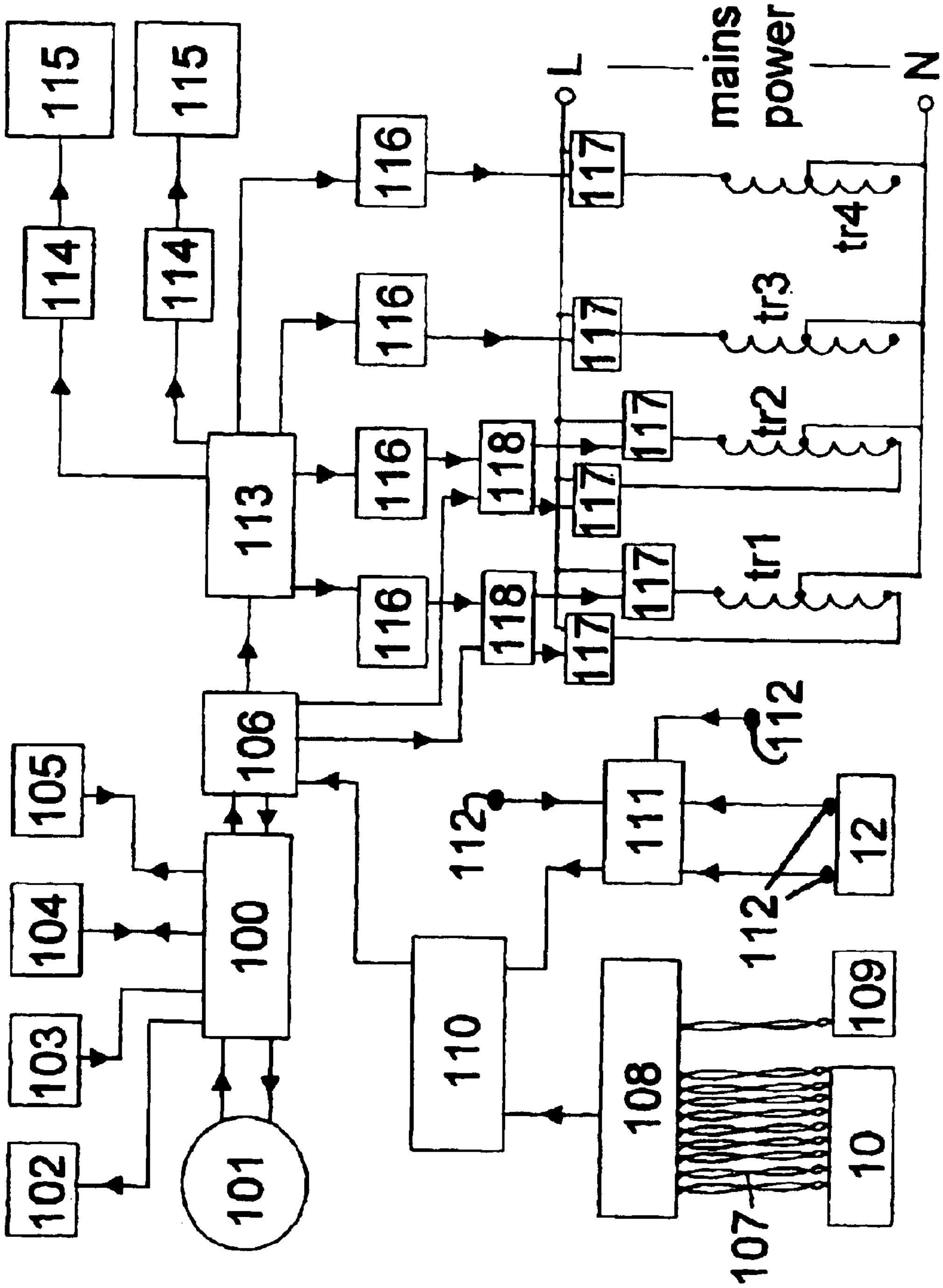
FIG. 18 shows a control system of the apparatus of FIGS. 17*a* and 17*b*.

FIG. 18 is a block diagram showing the control system for the apparatus of FIGS. 17A and 17B. It should be noted that there are a range of safety and initialisation systems in addition to the components shown in FIG. 18. However, these are not used as part of the normal operation of the control system and have been omitted for clarity.

The control system comprises an embedded computer 100 operating under the control of software 101. The embedded computer 100 has five associated input/output devices comprising an LCD 102, a keypad 103, a solid state disk 104, a comms port 105 and a digital input/output module 106. The digital input/output module 106 acts as an interface between the embedded computer 100 and the remaining parts of the control system.

The nine thermocouples 107 mentioned above are connected to a ten channel thermocouple amplifier 108 with cold junction compensation. A tenth thermocouple 107 connected to the amplifier 108 is arranged to sense the temperature of a heated lid 109 of the apparatus. Ten output lines from the thermocouple amplifier 108 are fed to a sixteen channel analogue to digital converter 110. The output of the analogue to digital converter 110 is connected to the digital input/output module 106.

Four lines from a four channel thermistor amplifier 111 are also connected to the sixteen channel analogue to digital converter 110. The four channel thermistor amplifier 111 receives signals from four thermistors 112. One of the thermistors 112 is used to sense ambient air temperature, another to sense outlet air temperature (that is the outlet of the cooling system) and the remaining two thermistors are used to sense the temperature of two of the bus bars 12. Again information from the thermistors is fed to the embedded computer 100 via the sixteen channel analogue to digital converter 110 and the digital input/output module 106.

As well as the sensing components described above, the digital input/output module 106 connects the embedded computer 100 to controlling components. The digital input/output module 106 is connected to an eight channel digital to analogue converter 113.

This digital to analogue converter 113 is connected to a pair of 30 volt proportionally controlled dc power supplies 114, each of which drives a respective cooling fan 115.

The eight channel digital to analogue converter 113 has further connections to four proportional phase angle controllers 116 which are used in controlling the operation of the transformers 13 (TR1–TR4) used to generate the heating current. Two of the proportional phase angle controllers 116 are connected directly to Triacs 117 used in controlling the current flowing through the primaries of the respective transformers (TR1 and TR4). The outputs of the other phase angle controllers 116 are used to control respective pairs of Triacs 117 via respective Triac selectors 118. The Triac selectors 118 also receive input directly from the digital input/output module 106.

Each Triac selector 118 is used to operate the respective pair of Triacs. 117 to control the sense or phase of current through the primary windings of the respective transformer (TR1, TR2) so that the current flow through these transformers 13 may be reversed. More detail of the control system and its operation is given below.

The four transformers (TR1–TR4) are toroidal cores with centre tapped 2000 turned primary windings—effectively giving two 1000 turned primary windings on each core. As will be clear the secondary windings consist of the copper bus bars 12, 12' shown in FIGS. 17A and 17B. In practice due to the symmetries in the design and the fact that the heating effect of current flow is independent of direction, only two (TR1 and TR2) of the four transformers need to be reversible in sense for the useful range of current flow patterns to be produced. Reversal of the sense of the transformers TR1 and TR2 is achieved by selecting which of the two Triac devices 117 connected to each of these transformers (TR1, TR2) is active. For safety reasons the Triac devices include opto-isolation between control signal and mains voltages.

The RMS magnitude of the ac power applied to the primary windings of the transformers is regulated by the phase angle control circuits 116 which switch the Triacs 117 on in synchronism with the main voltage cycles and at times calculated to produce particular RMS power levels as defined by the voltages applied to the phase angle control circuits 116 via the digital to analogue converter 113 and ultimately in accordance with the instructions from the embedded computer 100.

The digital to analogue converter 113 also supplies voltage signals to control the voltage output of the two power supplies 114 to control the respective fans 115 to cool the block as required.

It will be appreciated that the embedded computer 100 determines the requirements for cooling of the block by the fans 115, heating of the block via the transformers 13 and the appropriate current flow pattern at any moment in time, under the control of the software 101.

The computer 100 and software 101 makes the determination of heating and cooling requirements based on the program's thermal cycle and in response to feedback of the block 10 temperature at nine locations derived from the nine thermocouples 107 attached to the block 10. Additional information received from the four thermistors 112 is used to refine the calculation of heat input and cooling requirements.

Twisted pairs of wires are used to connect the thermocouples 107 and thermistors 112 to their respective amplifiers 108, 111, to minimise the effects of inductive pickup.

FIGS. 19 to 28 diagrammatically show the electrical arrangement of a well block 10 with electrical connections via an interface region 14 to copper bus bars 12 which carry heating currents from four power supply units P1 to P4. The situations, and in particular the current flow paths (approximately shown in heavy black), illustrated in FIGS. 19 to 28 apply equally to any four power supply setup. Thus FIGS. 19 to 28, illustrate different modes of heating which can be achieved using an apparatus of the type described above with reference to FIGS. 17 and 18. However, it should be noted that either dc or ac power supply units(PSUs) may be used. Changing the relative phase of an ac PSU by 180° is exactly equivalent to reversing the polarity of a dc PSU. Each PSU can be proportionally controlled with respect to the magnitude of current that it supplies and may be reversed in sense (ac) or polarity (dc) such that the relative phasing or polarity and hence the direction of instantaneous flow of current supplied by the PSU may be switched by 180°. As mentioned above thermocouples 107 are attached to the block to provide feedback to the control system of the block by indicating temperature at a number of different locations.

Of course in the embodiment shown in FIGS. 17 and 18 heating is by means of alternating current supplied by the four transformers 13 and their respective bus bars 12. Thus, in each of FIGS. 19 to 28 each PSU represents one of the transformers 13. As mentioned above each of the toroidal transformer coils 13 carries twin multiturn primary windings. The twin primary windings can be arranged so as to be driven in opposite sense so that an 180° change in relative phase can be made by selecting which of the two primary windings is driven. The arrows associated with the PSU's in FIGS. 19 to 28 indicate the relative phasing of the active PSU's in the corresponding mode. The PSU's without an associated arrow are off in that mode.

It will be noted that in the current flow paths illustrated in FIGS. 19 to 28, two of the PSU's P1 and P2 are shown as being capable of reversing phase. These correspond to the reversible transformers TR1, TR2 in the embodiment described in FIGS. 17 and 18. It is of course possible to produce embodiments in which all of the power supplies are reversible. This can provide more current flow paths but it is considered that those which are useful or most useful are achieved with two reversible power supplies. In alternative to power supplies P1 and P2 being reversible, P2 and P3 may be made reversible. It will be noted that P4 corresponds to the additional transformer 13' in the four transformer embodiment and this need not be reversible.

Figure 19:
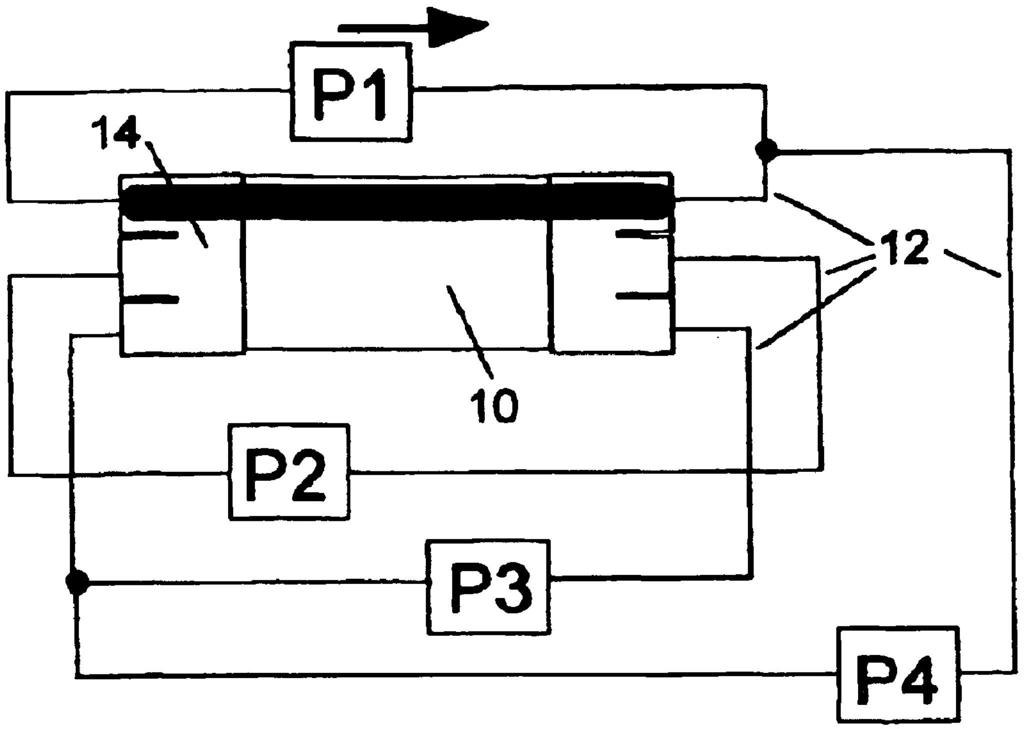
FIGS. 19 to 28 are schematic representations showing approximate current paths through the working area of a four power supply apparatus similar to that of FIGS. 17A and 17B for ten different transformer operating modes.
Figure 20:
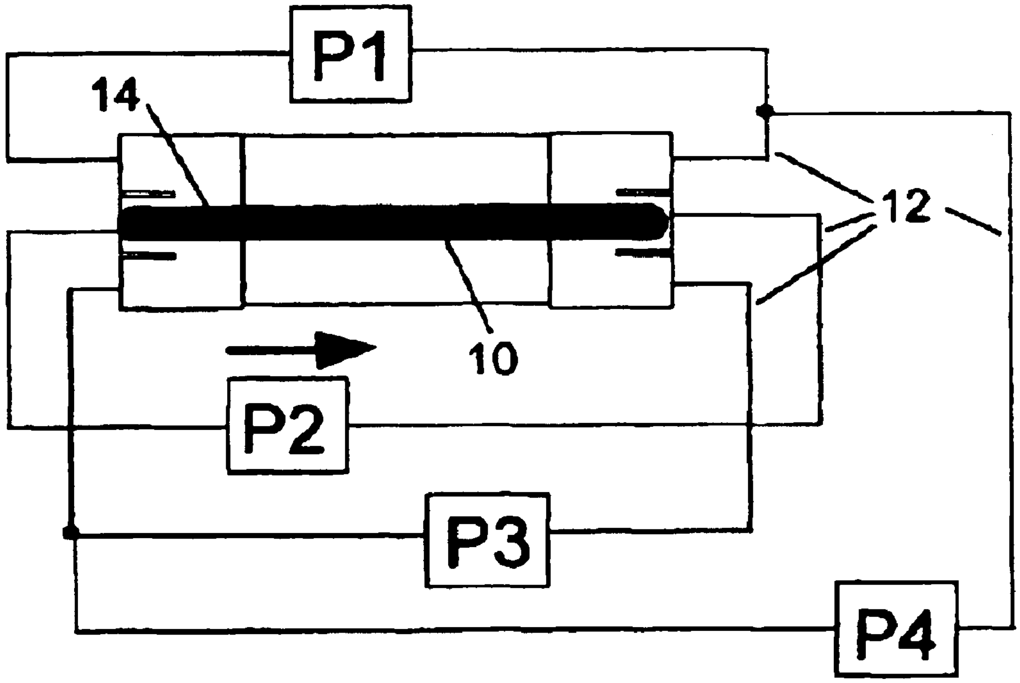
Figure 21:
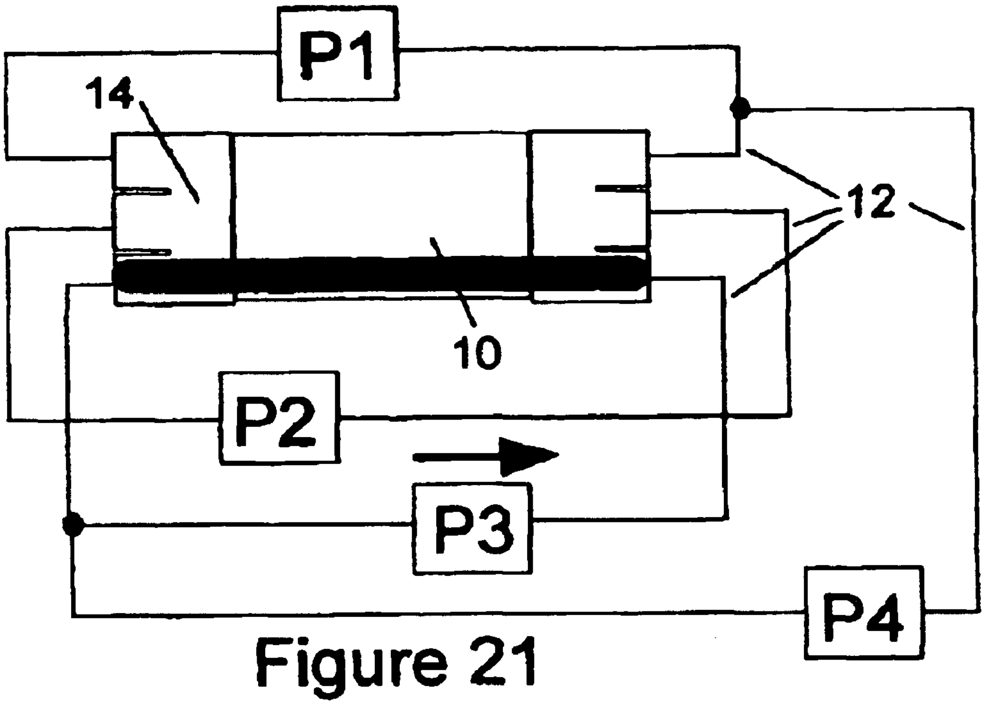
Figure 22:
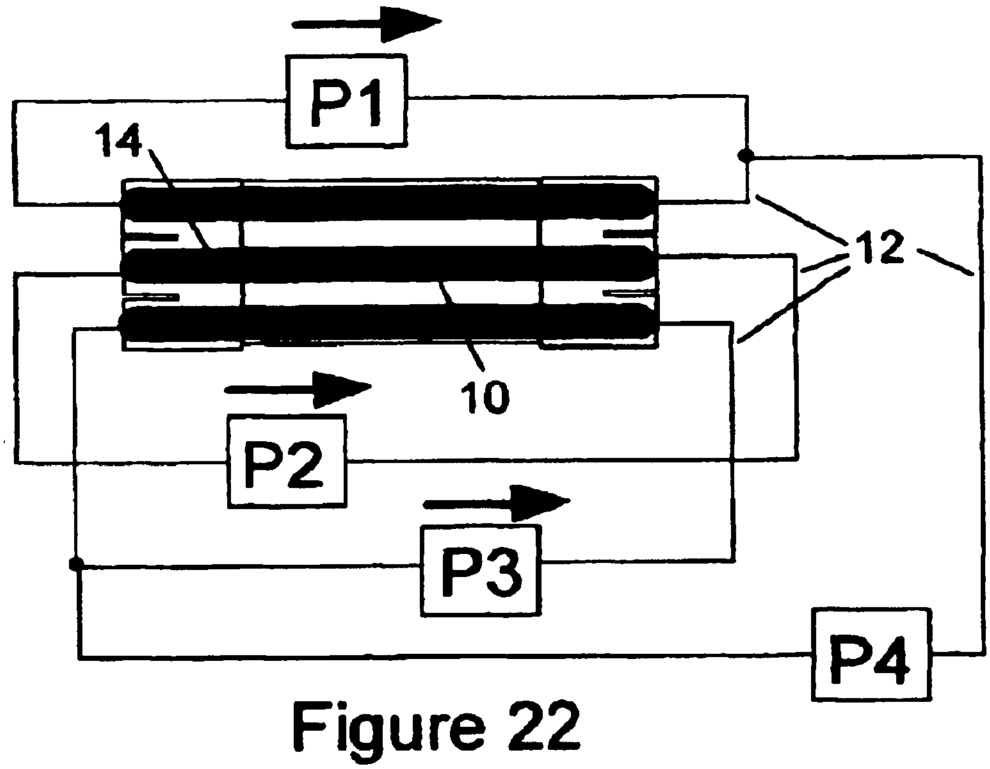

FIGS. 19, 20 and 21 show basic current flows through which the heat developed along the long sides (i.e. those to which the bus bars 12 are not connected) and the middle of the block may be controlled. In practice because the magnitudes of the current shown are individually controllable PSU's P1, P2 and P3 may all be turned on as shown in FIG. 22 but each may supply a different magnitude of current to provide the desired heating as determined by the control system in response to signals from the thermocouples.

Figure 23:
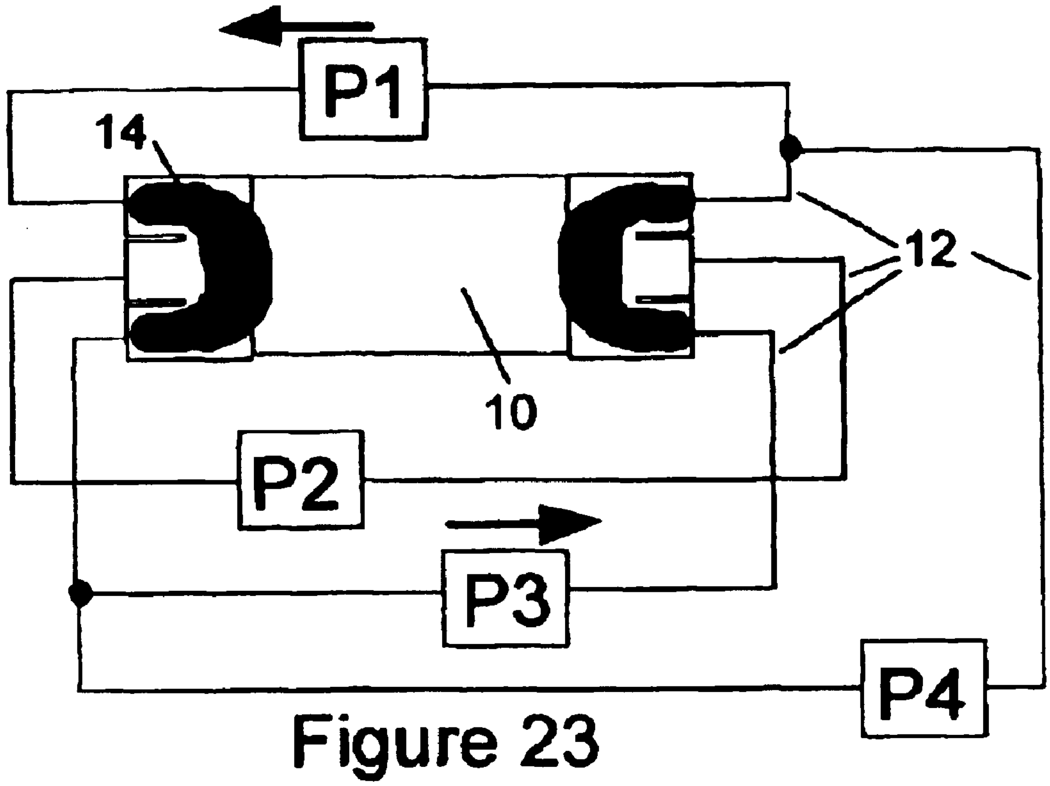
Figure 24:
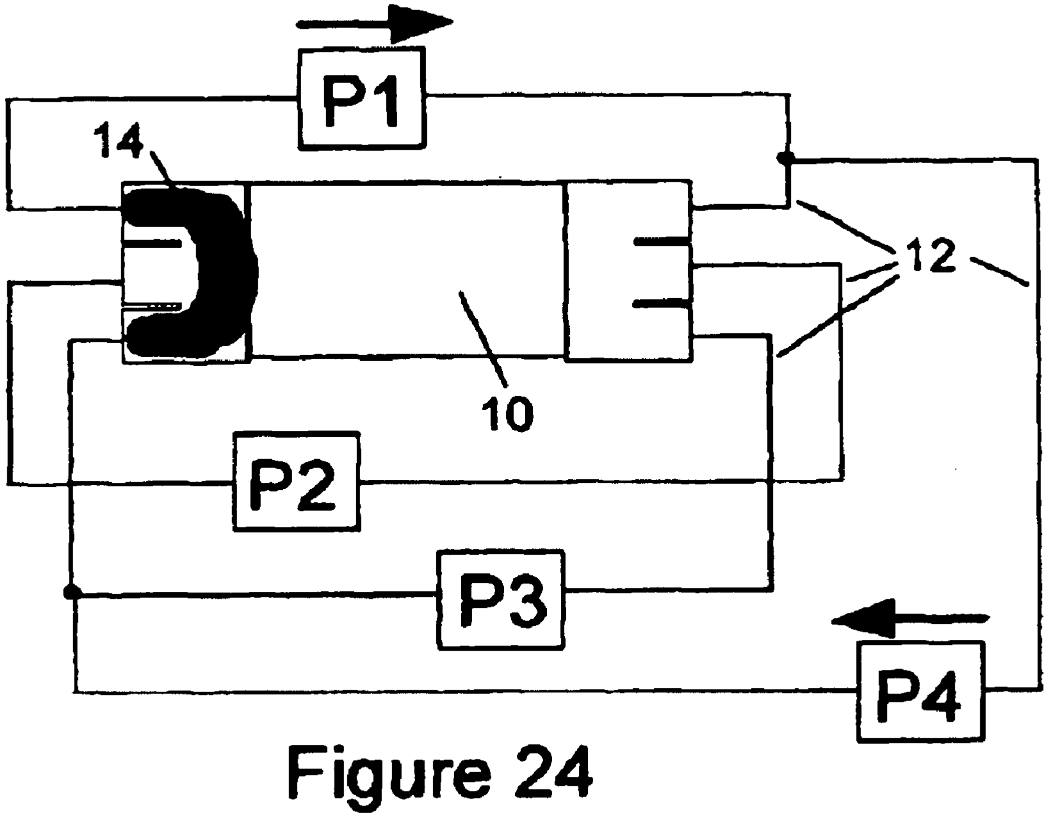
Figure 25:
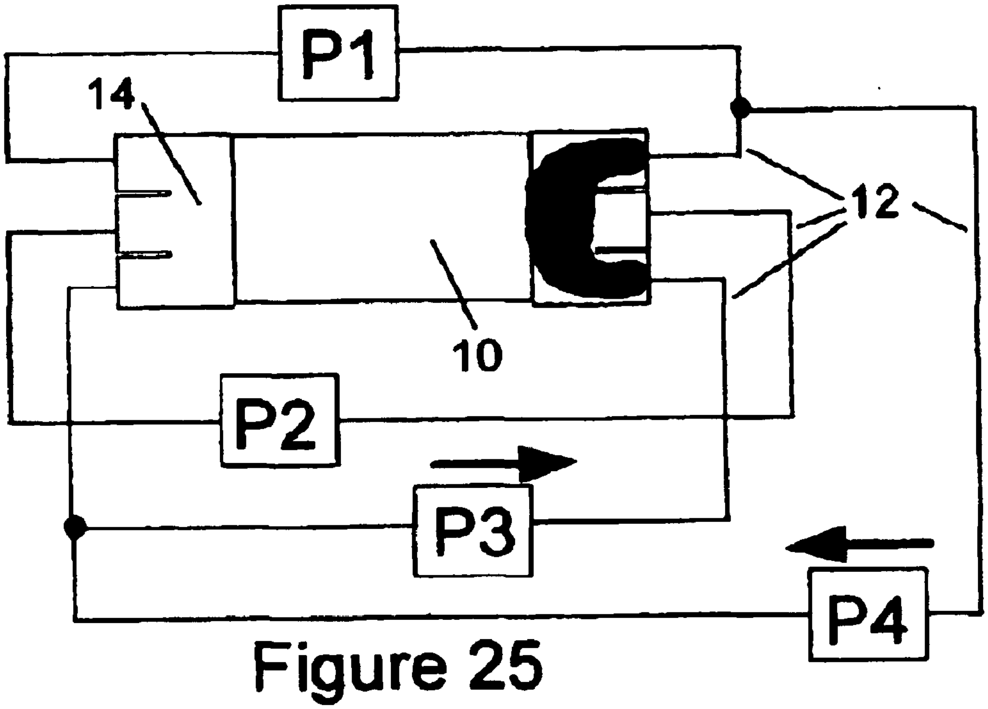

The short sides of the block (or the sides to which the bus bars are attached) may be heated simultaneously or separately. These different modes of heating are illustrated in FIGS. 23, 24 and 25. Again the power supply combinations used to generate these heating effects are illustrated in the corresponding Figures. The ability to heat the short sides of the block (i.e. the sides to which the bus bars are connected) independently is particularly important in compensating for the heat sinking effects of the bus bars 12.

Figure 26:
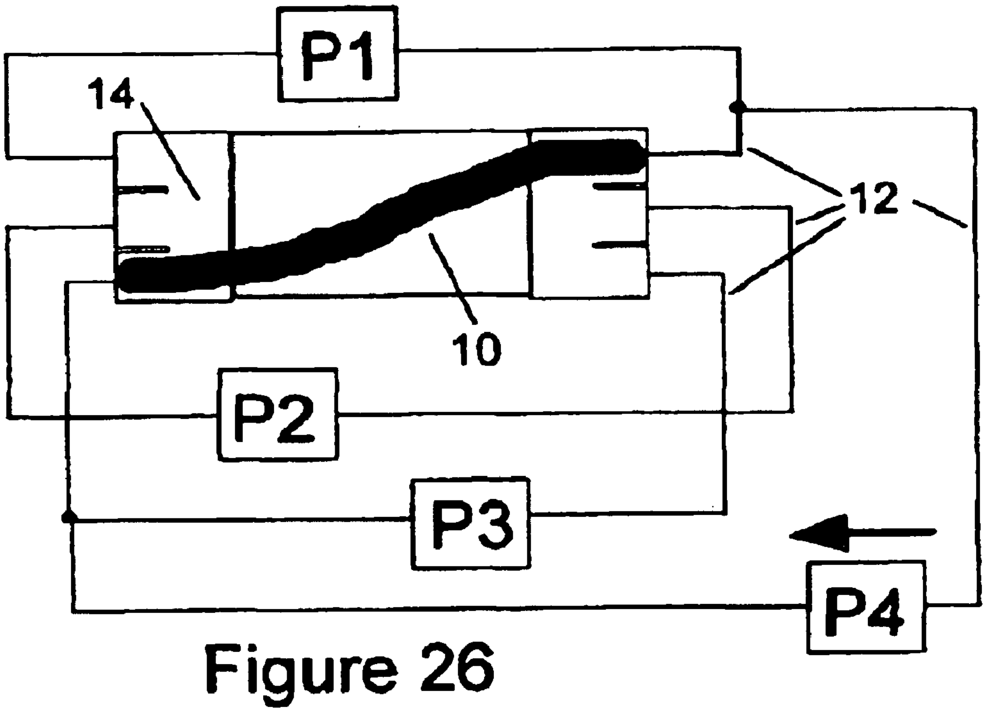

FIG. 26 shows one mode where the current path is made to pass through the centre of the block. The control system (of the type shown in FIG. 18) can allow for switching between the various modes of heating rapidly. In the case of an ac system the modes may be switched within one mains cycle. This means that time domain control may be used. For example, to give a high element of heating in the centre of the block, the heating modes shown in FIGS. 20 and 26 could be used alternately.

Figure 27:
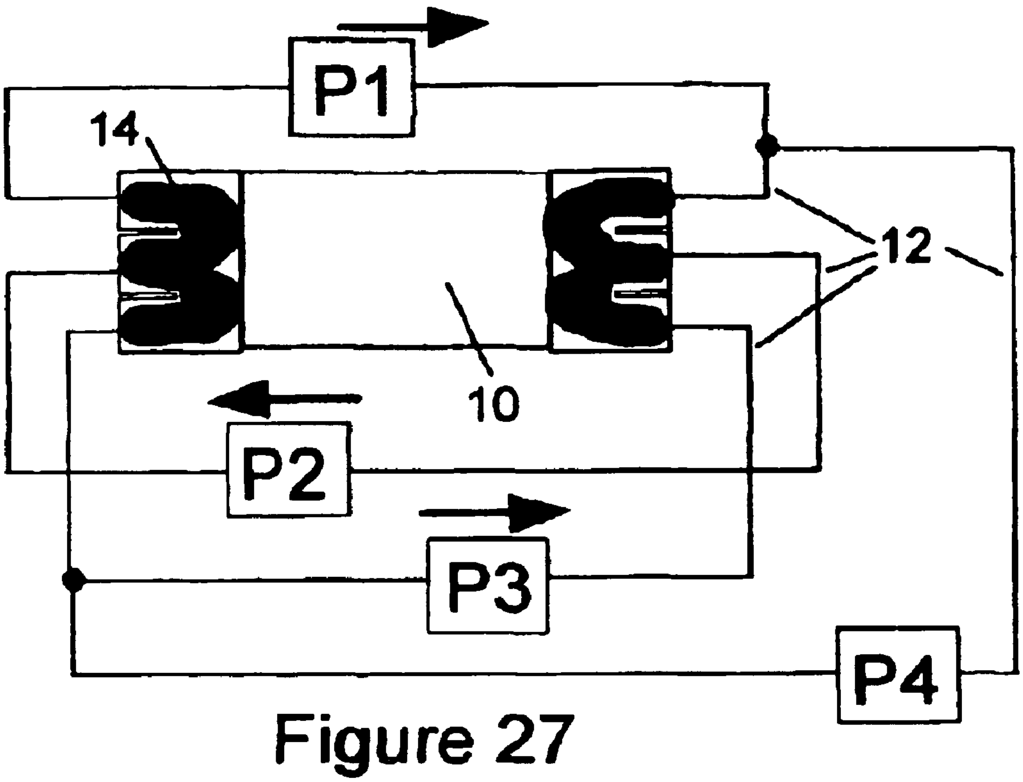
Figure 28:
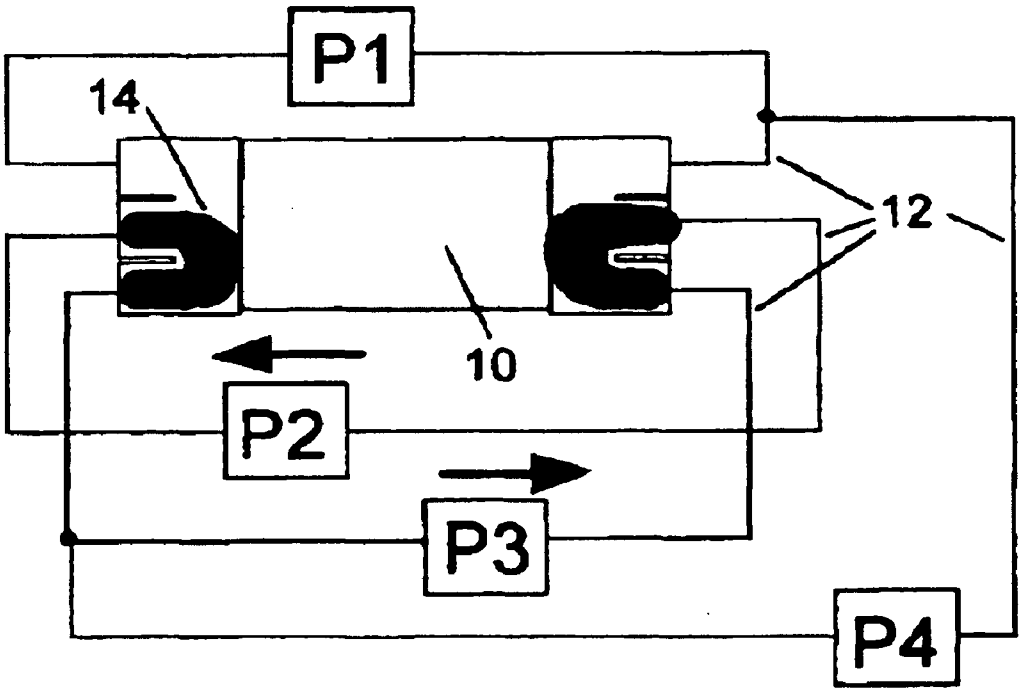

FIGS. 27 and 28 show examples of typical flow paths which may be used to trim and optimise the temperature distribution in the working area of the block.

In the arrangement used in FIG. 27, the current flow through the middle bus bar is the sum of the current flowing through the two outer bus bars. The current flow shown in FIG. 27 therefore produces maximum heating effect in the centre of the interface region. This mode may be used immediately after employing the flow mode shown in FIG. 23 where there is no current flow in the middle bus bar such that the heat sink effect of the middle bus bar may have lowered the temperature in the centre of the interface region. Similarly, the current flow pattern shown in FIG. 28 may be used after the flow mode shown in FIG. 19. Of course any current flow generated in the three transformer embodiment may be reproduced in the four transformer embodiment.

It will be appreciated that armed with the apparatus and ideas of the present specification it is possible to derive many different heating effects by operating the power supplies in different combinations, with different senses, and with different magnitudes.

What is claimed is:

1. Apparatus for heating samples, the apparatus comprising:

a specimen carrier in the form of a metallic sheet, in which a matrix of sample wells is incorporated, and a plurality of electrical current sources for applying electrical heating current through the carrier, each current source in the plurality of current sources being connected across the carrier and the plurality of electrical current sources together providing a variety of different possible current flow paths whereby localized regions of the carrier are selectively heatable.

2. Apparatus as claimed in claim 1 wherein there are four sources of current.

3. Apparatus as claimed in claim 1 wherein the current applied is alternating current.

4. Apparatus as claimed in claim 2 wherein the sources of current each comprises a secondary transformer loop, which loop is connected in series with the specimen carrier and provides alternating current in response to an alternating current applied to a primary winding associated with the loop.

5. Apparatus as claimed in claim 4 wherein there is a separate primary winding for each secondary loop, each primary winding connected to an alternating current power supply.

6. Apparatus as claimed in claim 4 and further comprising a controller device adapted to permit changing the relative phasing of the alternating current in at least one of the loops with respect to the others, thereby to change a locus of current flow through the carrier.

7. Apparatus as claimed in claim 6 wherein a phase change of 180 degrees in at least one of the secondary loops is selected by reversing the polarity of the current in the respective primary winding driving the secondary loop.

8. Apparatus as claimed in claim 1 wherein the current provided by the sources is direct current.

9. Apparatus as claimed in claim 8 wherein the sources of direct current comprise direct current power supplies.

10. Apparatus as claimed in claim 9 wherein each power supply is selected to be one of a linear, switch mode and battery power supply.

11. Apparatus claimed in claim 8 and further comprising a controller device adapted to permit changing the polarity of at least one of the sources of current with respect to the others, thereby to change a locus of current flow through the specimen carrier.

12. Apparatus as claimed in claim 1 comprising a temperature controller for controlling the magnitude of current flowing from each source of current, thereby to control the degree of heating conferred by the current through the carrier.

13. Apparatus as claimed in claim 12 wherein the specimen carrier is provided with a plurality of temperature sensors, which temperatures provide feedback to the temperature controller thereby to permit monitoring and control of the temperature of local portions of the carrier.

14. Apparatus as claimed in claim 12 wherein the temperature controller is programmable to provide predetermined thermal cycles in the carrier.

15. Apparatus as claimed in claim 13 wherein the temperature controller comprises a computer provided with digital to analogue converters for controlling the current sources and analogue to digital converters which provide temperature data feedback from the temperature sensors.

16. A method for heating samples comprising providing a specimen carrier in the form of a metallic sheet, in which a matrix of sample wells is incorporated, loading samples into a plurality of the wells, applying current to the specimen carrier, which current is applied by a plurality of sources of current, each source of current connected across the carrier and together providing a variety of different possible current flow paths whereby localized regions of the carrier may be selectively heated.

17. A method as claimed in claim 16 wherein the providing step includes providing an apparatus comprising, a specimen carrier in the form of a metallic sheet, in which sheet a matrix of sample wells is incorporated, and a plurality of electrical current sources for applying electrical heating current through the carrier, each current source in the plurality of current sources being connected across the carrier and the plurality of electrical current sources together providing a variety of different possible current flow paths whereby localized regions of the carrier may be selectively heated.

18. Apparatus for heating samples, the apparatus comprising:

a specimen carrier in the form of a metallic sheet, in which a matrix of sample wells is incorporated, means for applying electrical heating current through the carrier, characterized by a plurality of electrical current sources, each connected across the carrier and together providing a variety of different possible current flow paths whereby localized regions of the carrier may be selectively heated.

* * * * *